Figure 1:
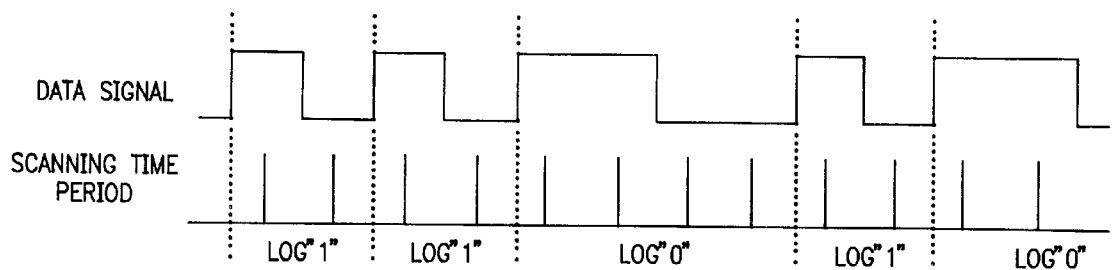

United States Patent [19]
Haass

[11] Patent Number: 5,820,081
[45] Date of Patent: Oct. 13, 1998

[54] PROCESS AND CIRCIUIT ARRANGEMENT FOR THE TRANSMISSION OF DIGITAL CONTROL DATA

[75] Inventor: Adolf Haass, München, Germany

[73] Assignee: Peter Doehler, Germany

[21] Appl. No.: 870,451

[22] Filed: Jun. 6, 1997

[30] Foreign Application Priority Data

Jun. 18, 1996 [DE] Germany .............................. 196 24 192

[51] Int. Cl.$^6$ ...................................... B61L 21/00
[52] U.S. Cl. .......................... 246/34 B; 246/3; 246/167 R
[58] Field of Search ............................ 246/3, 4, 7, 34 B, 246/167 R, 219

[56] References Cited

U.S. PATENT DOCUMENTS

| | | | |
|---|---|---|---|
| 4,207,569 | 6/1980 | Meyer | 246/7 |
| 4,572,996 | 2/1986 | Hanschke et al. | 318/341 |
| 4,582,279 | 4/1986 | Pontier | 246/34 B |
| 4,619,425 | 10/1986 | Nagel | 246/34 B |
| 4,732,355 | 3/1988 | Parker | 246/34 B |

*Primary Examiner*—S. Joseph Morano
*Attorney, Agent, or Firm*—Shlesinger, Fitzsimmons & Shlesinger

[57] ABSTRACT

The invention concerns a process and a circuit arrangment to transmit digital control data, preferably between a central station and individual locomotives of a model railway. In order to make possible an association between transmitters and receivers with strongly dispersed frequencies, the receiver frequency is to be adapted to the transmitter frequency. The step width of the adaptation and therefore of the synchronization is to be determined differently.

20 Claims, 3 Drawing Sheets

PROCESS AND CIRCIUIT ARRANGEMENT FOR THE TRANSMISSION OF DIGITAL CONTROL DATA

The invention concerns a process for the transmission of digital control data between a central station and the individual locomotives of a model railway.

Modern model railways are, as a rule, digitally controlled. Some use data transmission on the tracks for this purpose, in which a binary state is formed by half the frequency of the other binary state. For the connected users, in this case the receivers of the model locomotives moving on the tracks, it is necessary to be able to differentiate between the two binary states, i.e. the two different frequencies. This is not problematical, when an exact clock generator is provided both in the transmitter as well as in the receiver, such as in the form of a microprocessor and a quartz oscillator. But reliable transmission of control data is then not possible, if either the transmitter or the receiver or both are strongly dispersed in their frequency and are different. This is the case, for example, when different systems are to be combined with each other, which are controlled in different ways. Such combinations at the present time are scarcely possible.

The invention is based on the problem of designing a process and a circuit arrangement so that the transmission of control data from a transmitter to a receiver also functions reliably when the transmitter and receiver or both are strongly dispersed in their frequency. Thereby a practically unlimited combination of different systems, in particular of model railway installations, is to be made possible.

The problem is solved in accordance with the invention. Further embodiments of the invention are placed under protection in the related subclaims.

With the subject of the invention, the internal clock signal of the receiver with respect to the signal edges and the frequency or a multiple thereof is to be adapted to the external clock signal of the data signal which is received from the transmitter. Because the data signal includes short and long binary states, corresponding to log "1" or log "0", as a rule an adaptation to one of the two frequencies found in the data signal, which can be viewed as the clock frequencies of the transmitter, is possible. In this connection the point of departure is the consideration that the average number of the two binary states is practically the same. In practice, one binary state, for example log "0", is frequently twice as long as the other binary state, namely log "1". The invention is based on the further consideration that the ratio between the two binary states remains the same, as a rule, even given fluctuating frequencies.

Initially it is determined to which of the (clock) signals detected from the transmitted signal the clock signal of the receiver is to be adapted. Then in predetermined step widths, by a corresponding circuit arrangement which is upstream from the actual receiver of the user, such as, for example, the digital decoders of locomotives of a model railway installation, the adaptation of the clock signal is carried out, and in fact with respect to the coincidence of the pulse edges of the transmitted signal and of the frequency or a multiple thereof. Preferably, but not necessarily, this is done concerning the shortest frequency and/or period duration and/or change of the polarity of the signal which is found in the data signal of the transmitter.

A special feature of the invention is that the step width of this adaptation which is also described in control circuits generally as the manipulated variable, is to be made of different magnitude for the two opposite directions, namely in accordance with the shorter or longer period duration of the clock signal, for example by the factor 2. This has the result that the adaptation of the frequency in the desired direction is performed substantially faster, for example twice as fast as in the other direction. If one makes the step width of the same magnitude, as is usual in all the known control technology, this would not function in the case of the present circuit. On average, in fact the clock frequency would only move backwards and forwards by one step width and would remain unchanged on average.

To implement this, for the decision on the adjustment, only the actual data transfer has to be compared with the actual transfer of the internal clock signal, i.e. the respective clock change. If the internal clock signal is faster than the external clock signal, the oscillator which generates the internal clock signal is set to be slower; on the other hand, if the internal clock signal is slower than the external transfer, then the internal oscillator is set faster.

Certain computation conditions which are protected in the claims result from this consideration. Thus the internal clock generator is synchronized with the short data periods of the transmitter signal received, when the product of the number of the short periods of the data signal times the step width or adjustment magnitude is greater in the direction of the faster frequency of the oscillator than the product of the number of the long periods of the data signal multiplied by the step width or adjustment magnitude in the direction of the slower oscillator frequency. In the reverse conditions, namely when the first-named product is smaller than the second-named product, the internal clock generator synchronizes with the long data periods.

The manipulated variable or step width of the adjustment can be between 0.01 and 20% of the shortest frequency of the clock signal or of the oscillator frequency, and preferably this value is selected to be between 0.5 to 5% of this frequency. For example, the setting width in the direction of the faster oscillator frequency can be 1%, and in the direction of the slower oscillator frequency can be 0.5% of the oscillator frequency. In the example cited above, an adjustment is to be carried out in the direction of the shorter data period. The total correction in the desired direction is then twice as fast as the correction in the opposite direction.

A circuit arrangement which is upstream from the actual receiver of the user provides for a counter to count the oscillator frequency which is generated by the internal oscillator. As a further input, the complete external data signal which is received from the transmitter including the clock frequency is supplied to the counter. The output signal of the counter is sent to a second input of the comparator.

In addition, the circuit arrangement provides for a memory which receives the external data signal, and has an output to the second input of an error, the first input of which is connected with two different outputs of an adder control member.

The output from the memory is then also sent to this adder control member as well as simultaneously to a first input of the comparator. The output of the comparator is connected with a second input of the adder control member. The output of the adder is connected with the input of the memory. On the other hand, the output of the comparator is connected with a delay member, which scans the received input data signals in accordance with the corresponding delay and then decodes them and transmits these decoded data to the receiver.

Examples of the embodiments of the invention are shown in the drawings.

Figure 2:
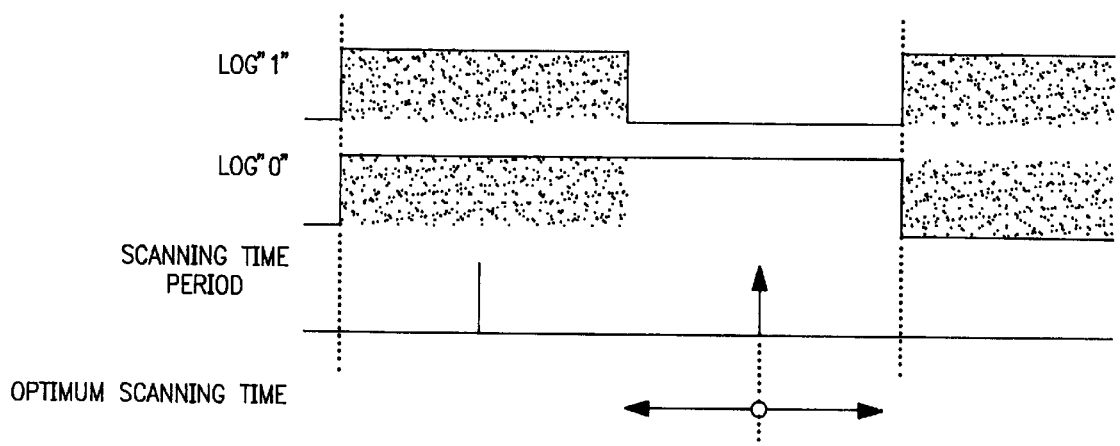
Figure 3:
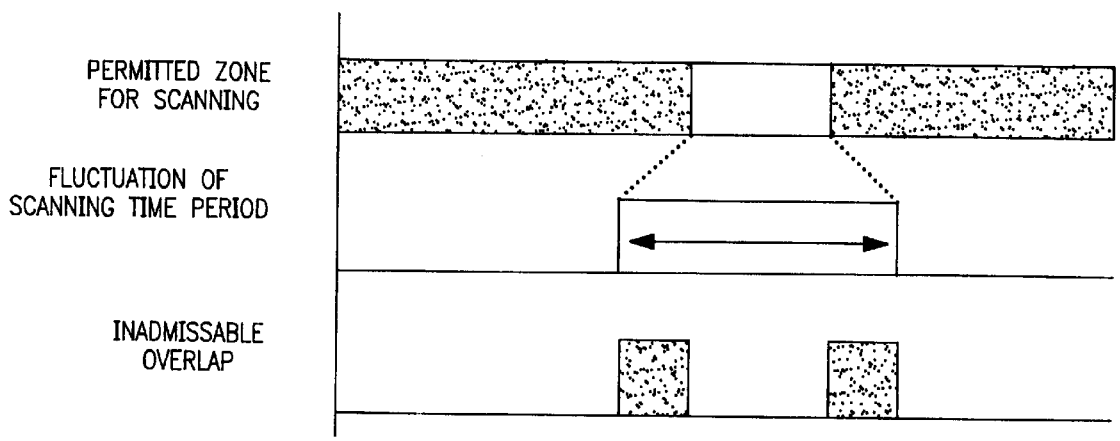
Figure 4:
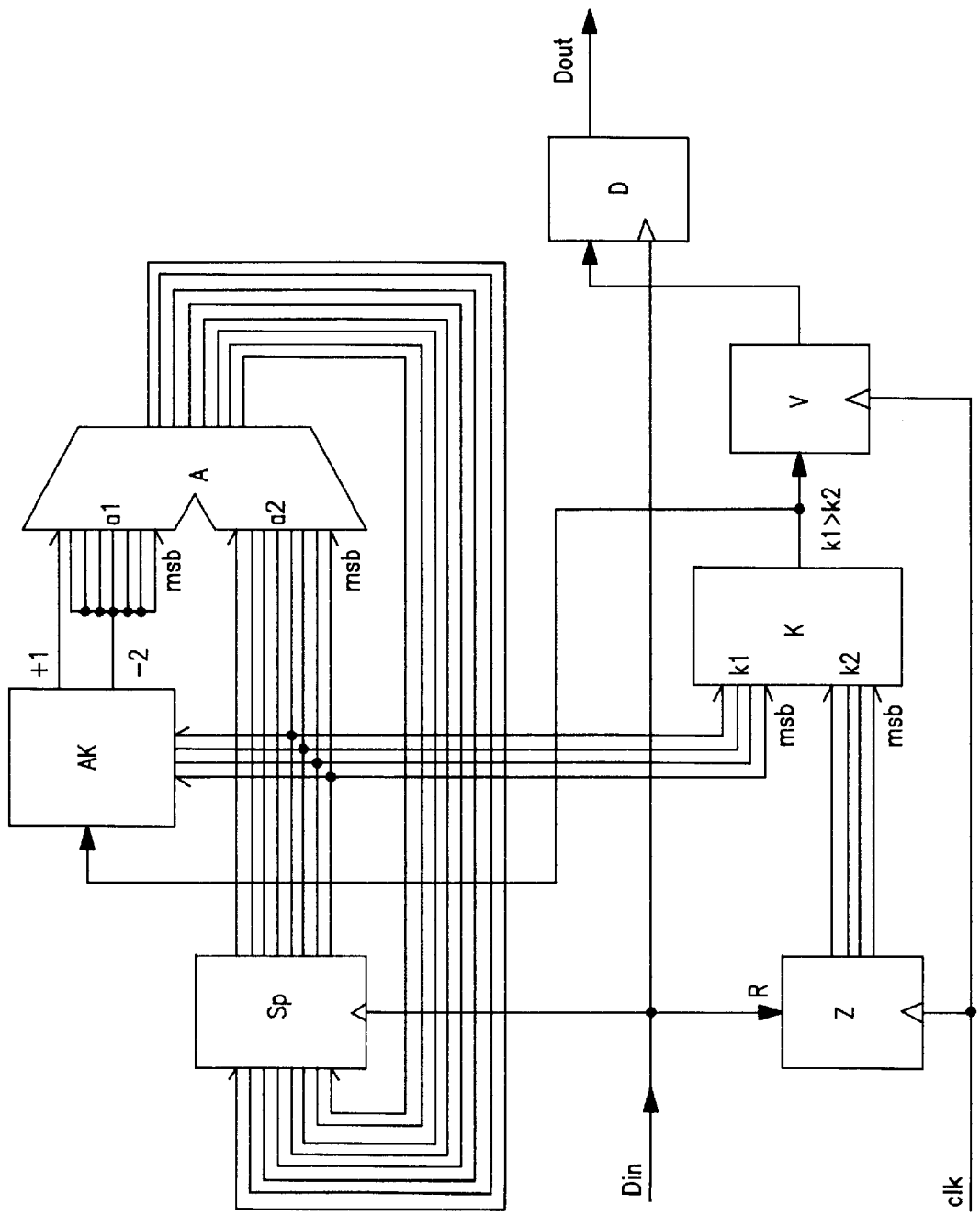
Figure 5:
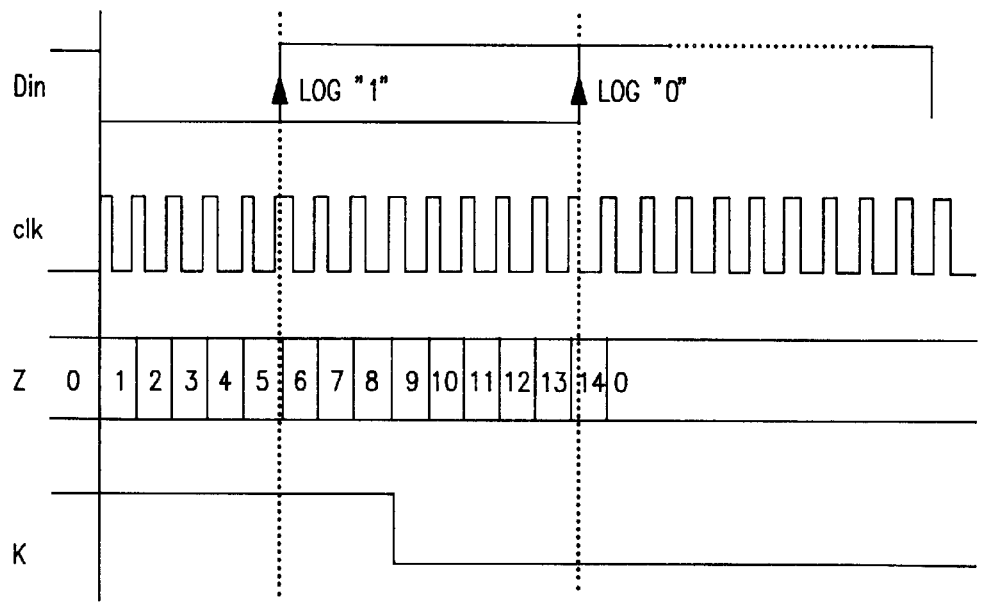
Figure 6:
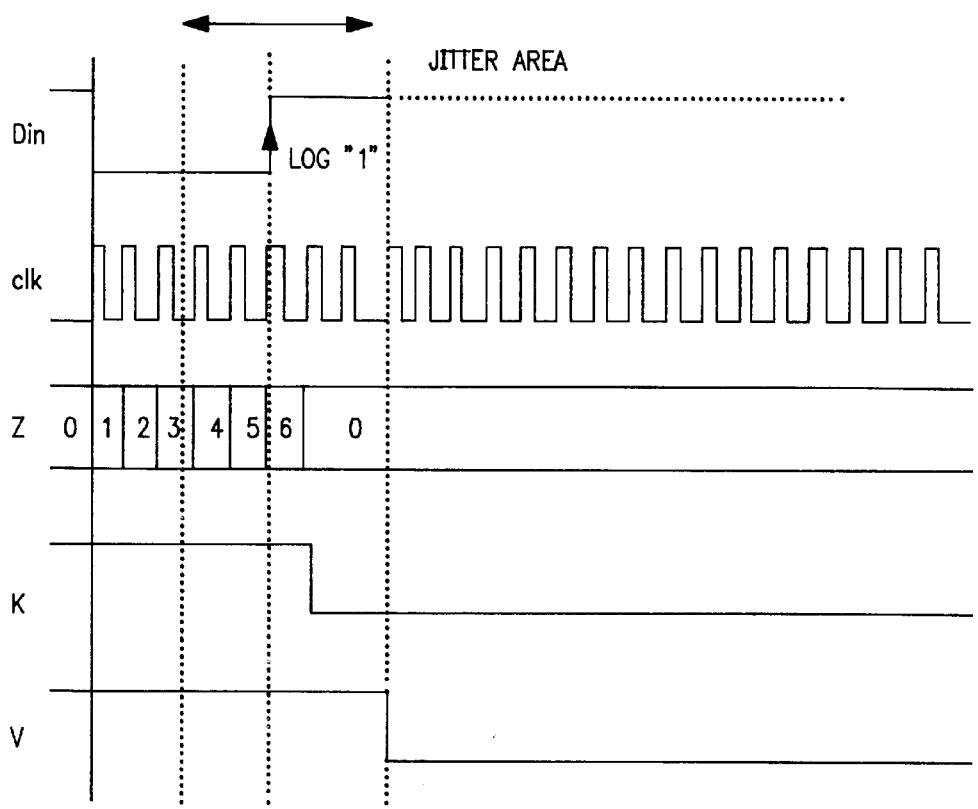

FIG. 1 shows the data signal with two binary states of different length and including the desired scanning time, FIG. 2 shows a time comparison of the two logic binary states, FIG. 3 shows unfavourable frequency conditions between the transmitter and receiver, FIG. 4 shows the schematic illustration of a circuit arrangement, FIG. 5 shows a sketch of the principle for the functioning of the circuit arrangment, FIG. 6 shows the example of an actual signal transmission for the logic binary state log "1".

In FIG. 1 at the top the two logic binary states of the data signal are shown, namely the higher frequency of log "1" and the lower frequency of log "0" with twice as long periods. Also shown is the same scanning time, which corresponds to half the length of the shorter binary state 1 and appears in the middle of a half period of the latter.

FIG. 2 shows on an enlarged scale the logic binary states of log "1" and log "0" as well as the corresponding scanning time below them. The horizontal arrows show the optimal scanning time around the middle of a half pulse.

By comparison with the drawing in FIG. 2, FIG. 3 shows unfavorable frequency allocations, namely at the top the permitted zone for scanning, below it the actual large fluctuation of the scanning time and in the bottom field, an inadmissible overlap based on the too strong fluctuation, which leads to faulty data transmissions.

The individual devices are described alphabetically as follows in FIG. 4:

| A | adder | a1 | 1st adder input |
|---|---|---|---|
| a2 | 2nd adder input | AK | adder control member |
| clk | oscillator clock frequency | D | decoder (data flip-flop) |
| K | comparator | k1 | 1st comparator input |
| k2 | 2nd comparator input | msb | most significant bit |
| R | resetting member reset input | Sp | memory |
| V | delay member | Z | counter |
| Din | input data signal | Dout | output signal to receiver |

In the example of an embodiment shown in FIG. 4 of a circuit arrangement, the following measures are provided:

With log "1" of the input signal, the counter Z is set back via the reset input and/or the reset member R. Therefore it is set to the count state "0". The state indices which are detected and shown in the memory Sp for the external clock signal are limited to the range between 2 to 15 by the logic adder control member AK. The clock frequency of the internal clock sensor is four to ten times faster as in the case of an oscillator in the form of a clock signal clk than the shortest frequency of the input data signal Din which is received.

Finally, the memory Sp and the data flip-flop take over the logic state of the received data signal at the respective input with the positive time edge.

If under these conditions the input data signal Din changes from log "1" to log "0", the counter Z begins to move upwards with the clock frequency clk. As long as the counter state of Z is smaller than the counter state of the memory Sp, the comparator K sends out a log "1". This log "1" is changed by the adder controller into a log "1" at the output "−2" as well as into a log "0" at the output "+1". On the arrival of the positive pulse edge of the input data signal, the memory Sp is reduced via a corresponding input signal at the first input a1 of the adder by 2.

If the count state of the counter Z at the moment of arrival of the positive pulse edge of the input data signal, however, is greater than the memory state of Sp, the comparator sends out a log "0". This leads at the output "+1" of the adder control member to a log "1", and at the output "−2 " to a log "0". The memory state Sp is then increased by 1 via the adder A.

If one considers that the data states of log "1" arrive as often at Din as the data states of log "0", the larger setting width then has the effect by −2 in the direction of a reduction of the count state Sp that the latter is always further reduced, and in fact until such time as some data transfers or polarity changes of log "1", i.e. of the shorter signal in terms of time, arrive after the change-over of the comparator from "1" to "0". Thereby stable synchronization is achieved.

Because the memory width in the memory Sp is significantly greater by comparison with the number of bits which are used in comparator K, this memory width, which is enlarged, for example, to 8 bits, has the effect of an integration of the memory value in the memory Sp. The correction of the memory value, for example, by +1/−2 is carried out on the lsbs (least significant bits), the mbs which are used for the comparator and therefore for the scanning, i.e. the most significant bits, remain as a result fairly stable and have for example the value 4 msb.

The delay stage V is used for the correct scanning of the data signal Din even with strong fluctuation in time of this signal. Because the memory has been adjusted fairly precisely to the statistical median value of the signal length of log "1" of the input signal, there is at first no scanning certainty for a log "1", data signal. In order to obtain the scanning certainty for these log "1" data signals as well, the delay member V is connected between them. For example, it operates with two time delays of clk. This causes a stable scanning of log "1", of the input signal Din, even when the latter is up to two time units of clk longer than its statistical median value. These facts of the case are shown graphically in FIG. 6.

FIG. 5 shows the practical signalling modus operandi of the circuit arrangement of FIG. 4. Right at the top the input data signal Din is shown with the two binary states log "1" and log "0". Below that the internal clock signal clk of the internal oscillator is shown, which has a substantially higher frequency compared with the external signals.

Under that the upwards counting of the counter Z from 0 to 14 is shown. In the bottom drawing, the output signal of comparator K is shown, in which a memory state of "8" forms the basis. The change of two binary states log "1" and log "0" is shown by all four drawings arranged under each other.

FIG. 6 shows the actual signal curve in the case of a binary state log "1" of the input data signal Din. The actual fluctuation range of this signal is shown between two arrows. The external clock signal, to which the adaptation of the internal clock signal is to be carried out, is shown by 3 perpendicular interrupted lines. Below the input data signal, in which after two clock signals the binary state log "1" appears, the internal clock signal clk is drawn in, having a substantially higher frequency than the binary state signal. Below that again, the upwards count of the counter is shown from 0 to 6, and the appearance of log "1", is shown as an input data signal.

Below that again, the output of comparator K is shown which, after the end of its counter state signal, changes its state with the FIG. "6", namely it switches over to "0".

The output signal of the delay member V which is shown right at the bottom supplies with delay, namely on the arrival of the next but one clock pulse, a clock signal to the data flip-flop of decoder D, in order, in certain circumstances, to cause the onward transmission of the input data signal Din as the output signal Dout to the receiver.

I claim:

1. A process for the transmission of digital control data signals comprising two binary states which differ from each other due to their respective periods of duration, from a transmitter with strongly dispersed transmission frequency to a receiver with strongly dispersed reception frequency, comprising
   a) determining the timing sequence of an internal clock signal generated in the receiver in relation to an external clock signal of the transmitter which is detected from the data signal transmitted from the transmitter to the receiver,
   b) causing the frequency of the internal clock signal of the receiver or a multiple thereof to be brought into conformity with the pulse signal edges of the transmitted signal and therefore the frequency of the external clock signal supplied by the transmitter with the data signal,
   c) determining the shortest/short or the longest/long pulse sequence of the data signal sent out by the transmitter,
   d) adjusting the frequency of the internal clock signal to be brought into conformity with this shortest/short or longest/long pulse sequence, and
   d) wherein the frequency adjustment of the internal clock signal is carried out in constant step widths,
   f) and wherein the step width of an adjustment in the direction of a higher internal clock frequency is different from that in the direction of a lower internal clock frequency.

2. A process in accordance with claim 1, characterized in that the step width in the direction towards which the adjustment of the internal clock frequency is to be made is greater than that in the opposite direction, so that on alternating adjustment in the two opposite directions, the resultant total adjustment of the internal clock frequency is greater in the direction towards which the desired clock frequency.

3. A process in accordance with claims 1 or 2, characterized in that the pulse duration of one of said two binary states is half as long as the pulse duration of the other binary state, and/or in that the polarity change of said one binary state is twice as frequent as that of said other binary state.

4. A process in accordance with one of the claim 3, characterized in that a small step width is selected in proportion to the pulse width of the external clock signal.

5. A process in accordance with claim 4, characterized in that the step width comprises 0.1–20% of the shortest clock pulse.

6. A process in accordance with claim 3, characterized in that with approximately the same number of the short binary states and the long binary states, the step width is selected in the direction of a higher clock frequency and/or in the direction of shorter periods of the data signal to be 1%, in the direction of lower clock frequency or longer periods of the data signal, to be 0.5% of the maximal clock frequency and/or the shortest pulse width, whereby an adjustment is carried out in the direction of higher clock frequency and/or shorter periods of the data signal.

7. A process in accordance with one of the claim 1, characterized in that to synchronize the internal clock signal of the receiver with a highest/high clock frequency and/or shortest/short period of the received data signal, the product is greater between
   the number of the shortest/short periods of the data signal within a predetermined time unit and the step width for the adjustment for the adjustment direction to a higher internal clock frequency
   than the product between the number of the longest/long periods of the data signal which is received within a predetermined time unit and the selected step width of the adjustment in the direction of a lower internal clock frequency.

8. A process in accordance with one of the claim 1, characterized in that to synchronize the internal clock signal of the receiver with a lowest/low clock frequency and/or the shortest/short period of the received data signal,
   the product between the number of the shortest/short periods of the data signal within a predetermined time unit and the chosen step width of the adjustment in the direction of the higher internal clock frequency is smaller than the product between the number of the longest/long periods of the received data signal within a predetermined time unit and the chosen step width of the adjustment in the direction of the lower internal clock frequency.

9. A circuit arrangement for carrying out the process in accordance with claim 1, which is upstream from the receiver and sends to it via a decoder (D) an output signal Dout of the input signal Din received from the transmitter, characterized by
   a) a counter (Z) which can be reset by a reset member (R) to count the internal clock signals supplied by an internal clock sensor (clk) whereby the external data signals (Din) are sent to the counter via the reset member,
   b) a signal memory (Sp), to which the external data signals are sent and which shows a value equivalent to the desired clock frequency,
   c) also characterized by an adder (A), to a first input of which an output signal is sent from the memory (sp), to a second input of which the output signal of an adder control member (AK) is sent, the output of which is sent to a data input of the memory (Sp),
   whereby the output signal of the memory (Sp) is sent to a first input of the adder control member (AK),
   d) furthermore characterized by a comparator (K) to which an output signal of the counter (Z) as well as the output signal of the memory (Sp) are sent and the output of which is connected with a second input of the adder control member (AK) and at the same time with a delay member (V), to which simultaneously the internal clock signal (clk) supplied by the internal clock sensor is sent, and which after corresponding delay sends out a data flip-flop, the clock of which receives the data input signal (Din) and from there transmits it onward as an output signal (Dout) to the receiver.

10. A circuit arrangement in accordance with claim 9, characterized by a switch device of the adder control member (AK) which depending on the output signal of the comparator K adjusts the adder by a first step width (+1) in a first direction or by a larger step width (−2) which is preferably twice as large in the opposite direction, in which the signal is sent to the first input (a1) of the adder (A), the output signal of which is sent to the input of memory (Sp), the output signal of which in its turn is sent to the second input (a2) of the adder (A) and simultaneously to the adder control member (AK) as well as to the first input (k1) of the comparator (K).

11. A circuit arrangment in accordance with claim 10, characterized in that the content of the memory supplies an equivalent value to the desired external clock signal.

12. A circuit arrangement in accordance with claim 11, characterized by the switch device at the first input of the adder control member (AK) to which the memory value (Sp) is supplied, ensures that a correction is only made the memory range is not exceeded or underattained.

13. A circuit arrangement in accordance with claim 9, characterized in that the counter (Z) is set to "0" via the input of the reset member (R) by one of the two binary signal states.

14. A circuit arrangment in accordance with claim 9, characterized in that the determination and display of the momentary state of the external clock signal and/or the adaptation of the internal clock signal to the external clock signal is/are carried out via the adder control member which is designed as a logic circuit (AK) and the adder (A) by a limited number of figures.

15. A circuit arrangement in accordance with claim 9, characterized in that the clock frequency (clk) of the internal clock sensor is from four to ten times as high as the shortest frequency contained in the received data signals.

16. A circuit arrangement in accordance with claim 15, characterized in that the counter (Z), on a change of the input signal from log "1" to log "0", begins to count with the clock frequency (clk) of the internal clock sensor.

17. A circuit arrangement in accordance with claim 9, characterized in that the comparator (K) delivers, as the output signal, log "1", to the adder controller (AK), when the count state of the counter (Z) is smaller than the count state of the memory (Sp), in that when the input equals log "1" at the first output of the adder control member (AK) at the first output equal to "−2", a log "1" is generated, and when the second output equals "+1" a log "0" is generated, in that thereby on reception of the positive edge of the input signal, the clock input of the memory (Sp) is reduced by 2, and in that with a count state of the counter (Z), on reception of the positive edge of the input data signal which is greater than the memory state of the memory (Sp) the output of the comparator supplies a log "0" to the second input of the adder control member (AK), in that when the second output equals "+1" of the adder control member (AK), a log "1" is generated and at the first output equal to "−2" a log "0" is generated, and in that thereby the memory state of the memory (Sp) is increased via the output of the adder (A) by 1, and in that these processes are repeated until such time as some change takes place in the data signal log "1" after the change of the comparator from "1" to "0".

18. A circuit arrangement in accordance with claim 17, characterized by a higher memory width of the memory (Sp) against an evaluation width of the comparator (K) such that an integration of the memory values of the memory (Sp) results and the most significant bit values for the comparator and scanning are largely stable, having the same constant value.

19. A circuit arrangement in accordance with claim 18, characterized by a circuit design of the delay stage (V) such that even with strong fluctuation in timing of the input data signal, stable scanning of the binary log "1" states is made possible.

20. A process as defined in claim 1, including transmitting said control data signals between a central station, and each of a plurality of individual locomotives of a model railway system, which locomotives travel on electrically conductive tracks, including utilizing said electrically conductive tracks for transmitting said digital control data signals between said central station and said locomotives.

* * * * *